United States Patent
Krčál et al.

(10) Patent No.: US 11,256,804 B2
(45) Date of Patent: Feb. 22, 2022

(54) MALWARE CLASSIFICATION OF EXECUTABLE FILES BY CONVOLUTIONAL NETWORKS

(71) Applicants: Avast Software s.r.o., Prague (CZ); Ústav informatiky AV ČR, v.v.i., Prague (CZ)

(72) Inventors: Marek Krčál, Prague (CZ); Martin Bálek, Teplice (CZ); Ondřej Švec, Velehrad (CZ); Martin Vejmelka, Prague (CZ)

(73) Assignees: Avast Software s.r.o., Prague (CZ); Ustav informatiky AV CR, v.v.i., Prague (CZ)

(*) Notice: Subject to any disclaimer, the term of this patent is extended or adjusted under 35 U.S.C. 154(b) by 528 days.

(21) Appl. No.: 16/184,423

(22) Filed: Nov. 8, 2018

(65) Prior Publication Data
US 2019/0138722 A1    May 9, 2019

Related U.S. Application Data

(60) Provisional application No. 62/583,366, filed on Nov. 8, 2017.

(51) Int. Cl.
    *G06F 21/56*    (2013.01)
    *G06N 3/02*     (2006.01)
    *H04L 29/06*    (2006.01)
    *H04W 12/12*    (2021.01)
    *H04W 12/128*   (2021.01)

(52) U.S. Cl.
    CPC ............ *G06F 21/562* (2013.01); *G06N 3/02* (2013.01); *H04L 63/1425* (2013.01); *H04W 12/12* (2013.01); *H04W 12/128* (2021.01); *G06F 2221/033* (2013.01)

(58) Field of Classification Search
    CPC ............ G06F 21/562; G06F 2221/033; G06F 21/566; H04W 12/128; H04W 12/12; H04L 63/1425; H04L 63/145; G06N 3/02; G06N 3/0454; G06N 3/08; G06N 3/04
    See application file for complete search history.

(56) References Cited

U.S. PATENT DOCUMENTS

| 6,112,219 A    | *  | 8/2000  | Girod ...................... G06F 17/147 708/402 |
| 9,721,097 B1   |    | 8/2017  | Davis et al.                                     |
| 10,664,592 B2  | *  | 5/2020  | De Gaetano ............ G06F 21/53                |
| 2010/0162400 A1| *  | 6/2010  | Feeney .................. G06F 21/563 726/24      |
| 2010/0329556 A1| *  | 12/2010 | Mitarai ................. G06K 9/6251 382/170     |
| 2013/0145472 A1| *  | 6/2013  | Ramabhatta .......... H04L 63/145 726/25          |

(Continued)

OTHER PUBLICATIONS

Klambauer et al., Self-Normalizing Neural Networks, Advances in Neural Information Processing Systems 30, Neural Information Processing Systems Conference, 2017, 10 pages, Neural Information Processing Systems Foundation, Inc.

*Primary Examiner* — Sanchit K Sarker
(74) *Attorney, Agent, or Firm* — Avek IP, LLC; William B. Kircher

(57) ABSTRACT

A convolutional deep neural network architecture can detect malicious executable files by reading the raw sequence of bytes, that is, without any domain-specific feature extraction or preprocessing.

17 Claims, 4 Drawing Sheets

(56) References Cited

U.S. PATENT DOCUMENTS

| | | | |
|---|---|---|---|
| 2014/0090061 A1* | 3/2014 | Avasarala | G06F 21/56 726/24 |
| 2014/0122391 A1* | 5/2014 | Mugan | G06N 5/025 706/12 |
| 2016/0093311 A1* | 3/2016 | Kim | H04S 3/008 381/22 |
| 2017/0017793 A1* | 1/2017 | Davis | G06F 21/565 |
| 2018/0060580 A1* | 3/2018 | Zhao | G06F 21/56 |
| 2018/0063169 A1* | 3/2018 | Zhao | G06F 21/562 |
| 2019/0138722 A1* | 5/2019 | Krcal | H04W 12/12 |
| 2020/0265298 A1* | 8/2020 | Leobandung | G06N 3/0454 |

* cited by examiner

MALWARE CLASSIFICATION OF EXECUTABLE FILES BY CONVOLUTIONAL NETWORKS

CROSS-REFERENCE TO RELATED APPLICATIONS

This Application claims priority to U.S. Provisional Patent Application Ser. No. 62/583,366, filed on Nov. 8, 2017, entitled "Malware Classification of Executable Files by Convolutional Networks," the entire disclosure of which is incorporated herein by reference.

FIELD OF INVENTION

The present invention relates generally to computer systems, and more particularly to classifying executable files using convolutional networks.

BACKGROUND OF INVENTION

Malware, short for "malicious software," is software that can be used to disrupt computer operations, damage data, gather sensitive information, or gain access to private computer systems without the user's knowledge or consent. Examples of such malware include software viruses, Trojan horses, rootkits, ransomware etc. Correctly identifying which files contain malware and which are benign can be a difficult task, because malware developers often obfuscate the code or take other measures designed to hide the malicious nature of the software. In view of the measures taken by malware developers to avoid detection, it can be difficult to properly classify executable files as being free of malware or as containing malware. It is often the case that much manual effort is required to classify executable files. However, even minor manual effort to classify is generally considered undesirable given the enormous number of different executable files that exist on all kinds of computing devices.

SUMMARY OF INVENTION

Systems and methods enable (i) receiving an executable file, wherein the executable file is comprised of one or more bytes, (ii) embedding the executable file by converting each of the bytes in the executable file to vectors, (iii) determining whether the executable file includes malware by passing the vectors through a convolutional neural network (CNN), wherein the CNN includes a plurality of convolutional layers and a global average pooling layer, and (iv) providing an output indicating the determination of whether the received executable file includes the malware.

BRIEF DESCRIPTION OF THE DRAWINGS

For a better understanding of the inventive subject matter, reference may be made to the accompanying drawings in which.

DETAILED DESCRIPTION

Figure 1:
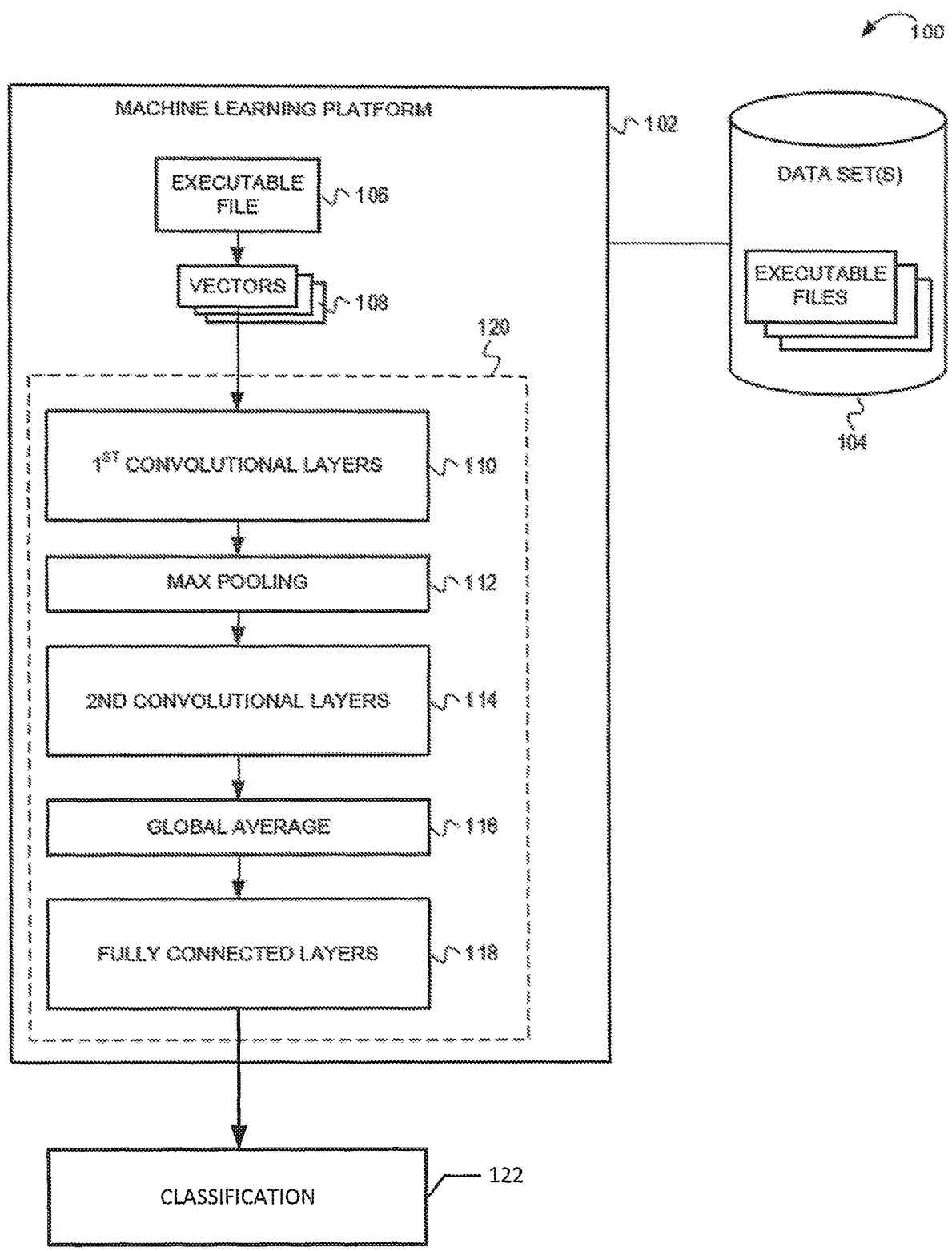
FIG. 1 is a block diagram illustrating an example system for malware classification using convolutional networks according to one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the figures, the same reference number is used throughout to refer to an identical component that appears in multiple figures. Signals and connections may be referred to by the same reference number or label, and the actual meaning will be clear from its use in the context of the description. In general, the first digit(s) of the reference number for a given item or part of the invention should correspond to the figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Embodiments of the invention can include a convolutional deep neural network architecture that can detect malicious executable files by reading the raw sequence of bytes, that is, without any domain-specific feature extraction or preprocessing.

FIG. 1 is a block diagram illustrating an example system 100 for malware classification using convolutional networks according to one embodiment of the invention. In one embodiment, system 100 includes a machine learning platform 102 having access to a data set 104 of executable files.

In some embodiments, the executable files in data set 104 can be Portable Executable (PE) files that are commonly used on various versions of the Microsoft Windows family of operating systems. However, the inventive subject matter is not limited to PE files, and in alternative aspects, the executable files can be ELF files commonly used in Linux or UNIX based system, Mach-0 files commonly used in MAC OS X operating systems, executable files for Android OS based smart phones and computers, or iOS executable files used on Apple iPhones and iPads. The embodiments are not limited to a particular type of executable file.

In some embodiments, the executable files can be sourced from files collected over time by anti-malware software supplied by an anti-malware software provider such as software available from AVAST Software s.r.o. of Prague, Czech Republic. In addition, the executable files can be sourced from providers such as Virus Total, the VirusShare corpus, or Maltrieve. The executable files can number in the millions, and in some embodiments, twenty million executable files can be used in the classification system and method. However, the embodiments are not limited to any particular number of files in the data set 104.

The files in the data set 104 can be labeled. In some embodiments, the files can be labeled as follows:
malware—a harmful program,
infected—originally benign (or possibly even malware) files with some local modification to perform the malicious actions,
adware—aggressive or unwanted advertising software,
potentially unwanted program (PUP)—essentially a malware that formally receives the credulous user's approval for its activities, or
clean—the file contains no known malware.

The classifications above arise from the way anti-malware programs typically treat files in given classes. As a result, the labeling may be dependent on how each vendor defines classes. However, generally, there are classes of benign and malicious files, plus the gray zone of PUPs. In some embodiments, labeling above can be simplified to a binary case, where "clean" files belong to a negative class (e.g., label 0), and the other labels simplified to a positive class (e.g., label 1). In some embodiments, PUPs can be excluded from the data set, as the distinction between PUP files and clean files may not be clear. In alternative embodiments, the fact that an executable file is classified as a PUP can be injected into the process through refined target labels.

The executable files can be separated into a training set that can include a validation set and a test set. The files comprising the training set, validation set, and test set can be determined according to a time the files were created. For example, files can be collected over a period of time. The training set can comprise files created during a first portion of the period of time, the validation set can comprise files created during a second portion after the first portion, and the test set can comprise files created during a third portion after the second portion. As an example, during the execution of one particular embodiment, the training set comprised portable executables collected during the year 2016 together with the first eight weeks of 2017 as the validation set. The test set comprised the following eight weeks of 2017 to determine how the model generalized to future samples. The time dependant split can be based on the needs of a production environment. For example, it is desirable to correctly classify new variants of malware and to do it as soon as possible. In some embodiments, the model can be designed to generalize two weeks ahead (or possibly less if online or incremental learning is used). However, in order to obtain reliable scores that are not too dependent on the specific training-test split, the inventors discovered that a testing time-window of more than six weeks is desirable. Those of skill in the art having the benefit of the disclosure will appreciate that incremental learning with moving training-test time windows could be applied to the systems and methods described herein, and that such incremental learning is within the scope of the inventive subject matter.

Machine learning platform 102 can be any type of computer or distributed system of computers, each with one or more processors and sufficient memory and other resources to process the executable files selected from data set 104. In some embodiments, some or all of the classification operations described herein can be performed on one or more graphics processing units (e.g., "graphics cards"). In some embodiments, the graphics processing units include four Nvidia GeForce GTX Titan X graphics cards.

Machine learning platform 102 can include a neural network architecture 120. A set of vectors 108 can be created from an input executable file 106 selected from the input data set 104. In some embodiments, each byte of the executable file 106 can be represented as one of the vectors 108 in an input sequence. The vectors 108 can be passed through the neural network architecture 120 to extract features associated with the input executable file 106. In some embodiments, the features can be extracted from vectors 108 that represent any portion of the input executable file 106. Additionally or alternatively, the features can be extracted from vectors 108 that represent only specific portions of the input executable file 106 (e.g., just an initial segment of the file, the beginning and/or the end of the file, unencrypted/unobfuscated portions of the file, less dense portions of the file, etc.). In some embodiments, the neural network architecture 120 may comprise an executable file classification engine.

In some embodiments, neural network architecture 120 includes a first set of convolutional layers 110 and a second set of convolutional layers 114 with a max pooling layer 112 in between. In some embodiments, the first set of convolutional layers 110 and the second set of convolutional layers 114 each have two layers. In some embodiments, the output of the layers (e.g., every individual layer or only selected layers within the first set of convolutional layers 110 and the second set of convolutional layers 114) can be rectified by rectified linear units (ReLUs). In alternative embodiments, the units can have an activation function that is nonlinear. The layers in the first set of convolutional layers 110 and the second set of convolutional layers 114 can produce representations with sizes depending (roughly linearly) on the size of the executable file 106.

A global average 116 can be formed from the output of the second set of convolutional layers 114. In some embodiments, feature-wise average operations project the variable size representation to a fixed-sized one. This can be desirable because it can be more suitable for low false positive rates than max pooling operations.

The global average 116 can be passed through a set of fully connected layers 118. In some embodiments, there can be four fully connected layers. In some embodiments, the units in the fully connected layers 118 can be "scaled exponential linear units" (SELUs). Details on SELUs can be found in Gunter Klambauer, Thomas Unterthiner, Andreas Mayr, and Sepp Hochreiter. Self-normalizing neural networks. CoRR, abs/1706.02515, 2017, which is hereby incorporated by reference herein. In alternative embodiments, the units of the fully connected layers can be ReLUs.

The output of the last layer of the fully connected layers 118 can be the classification 122 of the executable file 106. In some embodiments, the classification output 122 can be binary, that is, the output can indicate whether neural network architecture classifies the executable file as clean (i.e., free of malware) or as containing malware. In alternative embodiments, the classification output 122 can correspond to one of the labels typically associated with malware, that is, the labels discussed above: malware, infected, adware, PUP, and clean. The executable file 106 may be executed or not executed based upon the classification. For example, the executable file may be executed if it is classified as clean or not executed (e.g., quarantined, etc.) if it is classified as containing malware.

Figure 2:
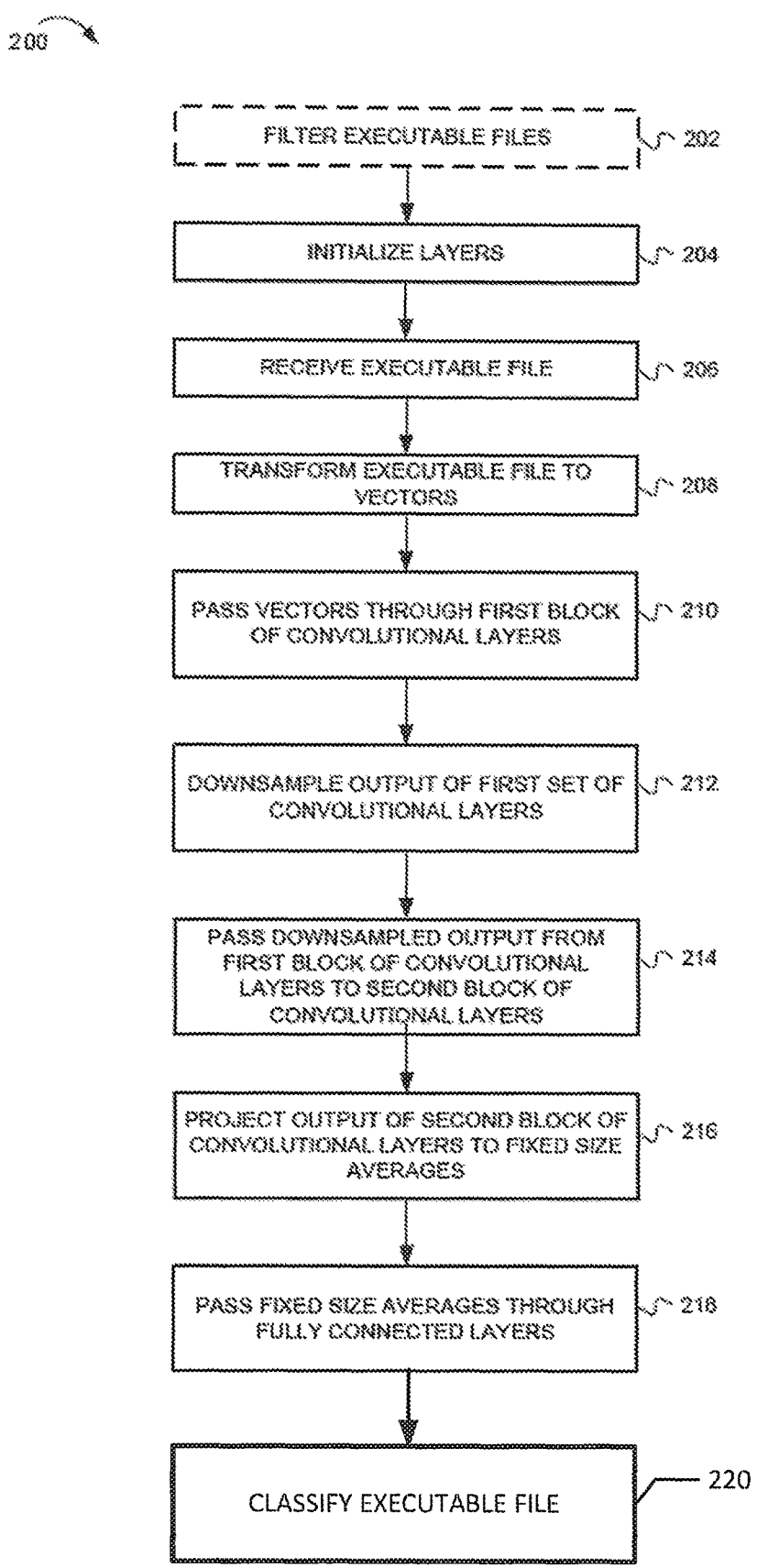
FIG. 2 is a flow chart illustrating operations of a method for malware classification using convolutional networks according to one embodiment of the present invention.

Further details on the operation of the above described system 100 will now be presented with respect to FIG. 2.

FIG. 2 is a flowchart illustrating operations of a method 200 for malware classification using convolutional networks according to one embodiment of the present invention. The method 200 may, in some aspects, constitute computer programs made up of computer-executable instructions. Describing the method 200 by reference to a flowchart enables one skilled in the art to develop such programs including such instructions to carry out the methods on suitable processors (the processor or processors of the computer executing the instructions from computer-readable media). The method 200 illustrated in FIG. 2 is inclusive of acts that may be taken by an operating environment (e.g., machine learning platform 102 of system 100) executing example embodiments of the invention.

The operations of block 202 are optionally executed in some embodiments. At block 202, the input data set of executable files can be filtered. Various filtering mechanisms can be used. In some embodiments, executable files in the input data set can be filtered based on an age of the executable file. For example, executable files collected during the most recent sixteen months are included, and files older than sixteen months are filtered out. Executable files in the input data set can also be filtered by size in some embodiments. For example, executable files greater than twelve kilobytes are included, while files less than twelve kilobytes are filtered out of the process. This can be desirable because it avoid processing stub executables having an unclear ground truth. Similarly, files less than 512 kilobytes can be included, while files greater than 512 kilobytes can be filtered out of the process. This can be desirable because it can make the training manageable even with moderate computational resources.

Additionally, files that have been packed in some way can be filtered from processing. This can be desirable, because such files may not be suitable for analysis because a considerable part of the machine code highly obfuscated as decompression or decryption of the machine code occurs during the runtime of the executable. However, in some embodiments, the method can include unpacking the executable. Further, in some embodiments, the packed files can be processed as-is, and can be classified based on features present in the unobfuscated portions of the files, such as the file header.

At block 204, the layers of the neural network are initialized. In some embodiments, the convolutional layers 110 and 114 can be initialized with random values drawn from a uniform distribution. The fully connected layers 118 can be initialized as described in Gunter Klambauer, Thomas Unterthiner, Andreas Mayr, and Sepp Hochreiter. Self-normalizing neural networks. CoRR, abs/1706.02515, 2017, which has been previously incorporated by reference.

At block 206, an executable file 106 is received. As noted above, the executable file 106 can be taken from a set of executable files in a data set 104, and may be filtered as described above with reference to block 202.

At block 208, bytes of the executable file 106 are transformed into vectors. Each byte of the executable file can be individually embedded into an eight-dimensional vector. For example, each byte of the executable file can be transformed from discrete values/scalars to a vector of eight real values, each bit to one number. In some embodiments, the eight-dimensional vector can have the form $(\pm \frac{1}{16}, \ldots, \pm \frac{1}{16})$ according to its binary representation. In some embodiments, the binary representation of the executable file 106 is embedded to the vertex set of a properly scaled zero-centered 8-hypercube. Further, in some embodiments, there is no performance difference between learnable and non-learnable embeddings.

At block 210, the vectors are passed through the first set of convolutional layers 110. In some embodiments, the vectors are passed through two convolutional layers having ReLUs as units.

At block 212, the output of the first set of convolutional layers 110 is downsampled. In some embodiments, a max pooling 112 is created by downsampling the output of the first set of convolutional layers 110.

At block 214, the downsampled output of the first set of convolutional layers 110 is passed through a second set of convolutional layers 114. In some embodiments, the max pooling 112 is passed through two convolutional layers.

In some embodiments, a stride is applied to the first set of convolutional layers 110 and the second set of convolutional layers 114. For example, a stride of four can be applied to the first set of convolutional layers 110 and a stride of eight can be applied to the second set of convolutional layers 114.

At block 216, the output of the second set of convolutional layers 114 is projected to a fixed-size set of averages. In some embodiments, a feature-wise average operation is used to project the variable size output of the second set of convolutional layers 114 to a fixed size representation.

At block 218, the fixed size representation can be passed through the set of fully connected layers 118. In some embodiments, there can be four fully connected layers. The fully connected layer can use SELUs as units.

At block 220, the executable file is classified. In some embodiments, the classification output can be binary, that is, the classification output can indicate whether neural network architecture classifies the executable file as clean (i.e., free of malware) or as containing malware. In alternative embodiments, the classification output can correspond to one of the labels typically associated with malware, that is, the labels discussed above: malware, infected, adware, PUP, and clean. In some embodiments, a computer system may use the classification output to quarantine, reject execution, or allow execution of the executable file.

During the training phase, various operations and parameters can be used to influence the training time and resources, classification and/or classification accuracy for the neural network architecture 120. For example, in some embodiments, the training loss is the usual cross-entropy.

In some embodiments, strides, pooling window sizes, or other hyper-parameters (e.g., number of layers, number of convolutional kernels, size of the convolutional kernels) can be tailored for executables. For instance, the Microsoft C++ compiler aligns the beginnings of so-called sections within the executable to multiples of 4 kilobytes; that can be the shift between the receptive fields of two adjacent units in the top convolutional layer.

In some embodiments, the neural network architecture 120 uses an l2 weight decay of $3*10^{-7}$. This can be useful in preventing gradients from exploding in the final stages of the training.

In some embodiments, stabilization of the training can be achieved by smoothing the labels 0 and 1 to the values $5 \cdot 10^{-4}$ and $1-5 \cdot 10^{-4}$, respectively but this can cause a decrease in the restricted AUC score by approximately 2.5%.

In some embodiments, the weight associated with a class can be adjusted. For example, the weight associated the clean class can be doubled. In other words, every clean sample contributes to the loss twice as much as every malicious sample. This can result in an improved restricted AUC (Area Under Curve) score at the cost of slightly reduced loss and accuracy on the validation set.

In some embodiments, the neural network architecture 120 is trained using the Adam optimizer with the default parameters as described in Diederik P. Kingma and Jimmy Ba. Adam: A method for stochastic optimization. CoRR, abs/1412.6980, 2014, which is hereby incorporated by reference herein. Those skilled in the art will appreciate that the neural network architecture 120 may be trained using other optimizers including, but not limited to, RMSprop, for example.

Further, in some embodiments, an early stopping criterion can be used based on the validation set.

Figure 3:
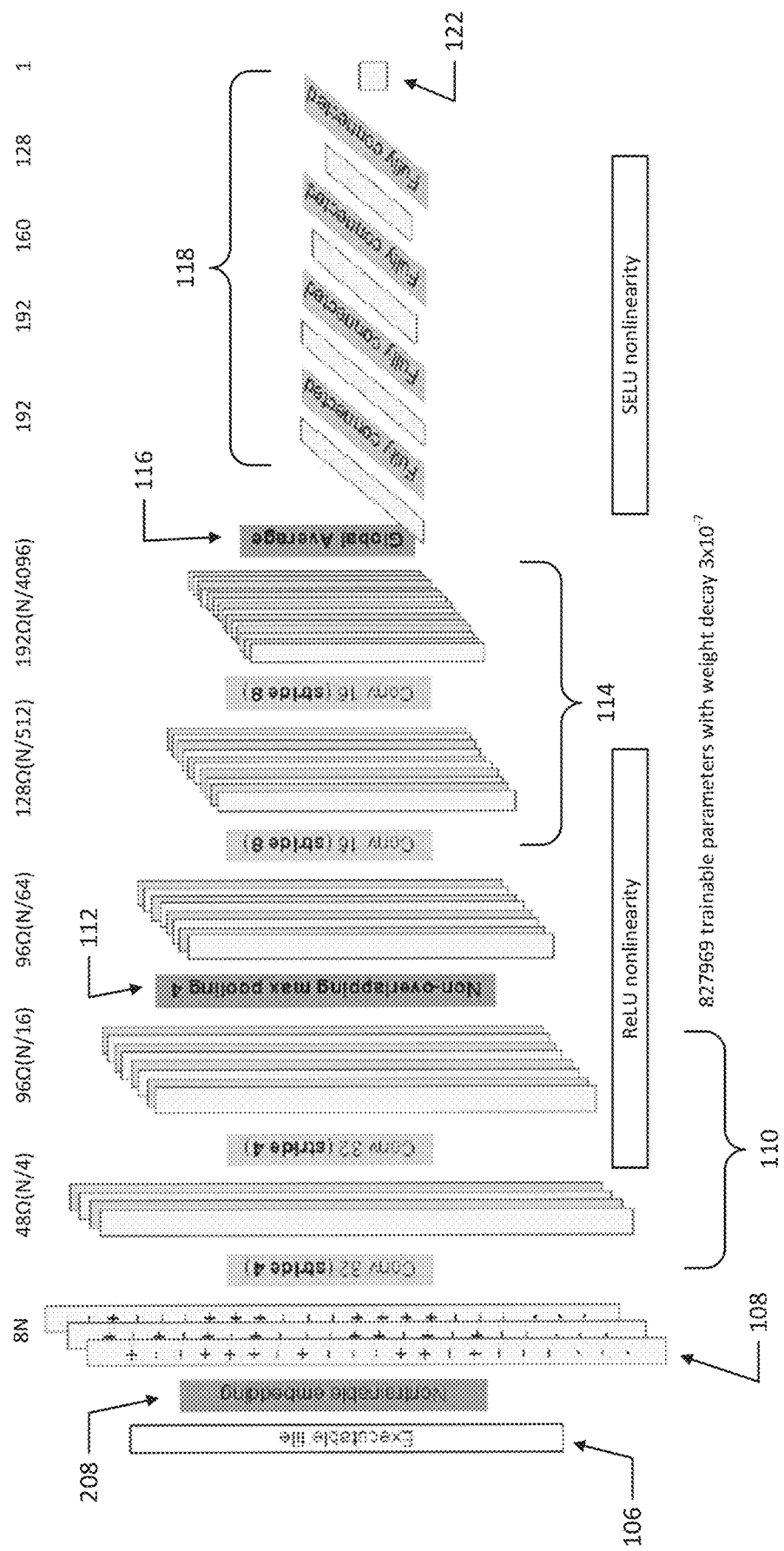
FIG. 3 is a block diagram illustrating further details of an example system for malware classification using convolutional networks according to some embodiments of the present invention.

FIG. 3 is a block diagram illustrating further details of an example system for malware classification using convolutional networks according to one embodiment of the present invention. As illustrated, the executable file 106 is embedded by a non-trainable embedding layer. As indicated by the parameter at the top, the size of the representation (i.e., the number of values that represent) of the executable file 106 after the embedding layer is eight times the number of bytes (8N) in the executable file 106 because each byte of the executable file 106 was embedded into an 8-dimensional vector. The vectors are then passed through the first set of convolutional layers 110. After the first layer of the first set of convolutional layers 110 the size of the representation of the executable file is $48*\Omega(N/4)$, and after the second layer of the first set of convolutional layers 110 the size of the representation of the executable file is $96*\Omega(N/16)$. After the max pooling layer 112 the size of the representation of the executable file is $96*\Omega(N/64)$. After the first layer of the second set of convolutional layers 114 the size of the representation of the executable file is $128*\Omega(N/512)$, and after the second layer of the second set of convolutional layers 114 the size of the representation of the executable file is $192*\Omega(N/4096)$. After the global average layer 116 the size of the representation of the executable file is 192. After the first fully connected layer 118 the size of the representation of the executable file is 192, after the second fully connected layer 118 the size of the representation of the executable file is 160, after the third fully connected layer 118 the size of the representation of the executable file is 128, and after the fourth fully connected layer 118 the size of the representation of the executable file is one (i.e., the classification output 122).

Figure 4:
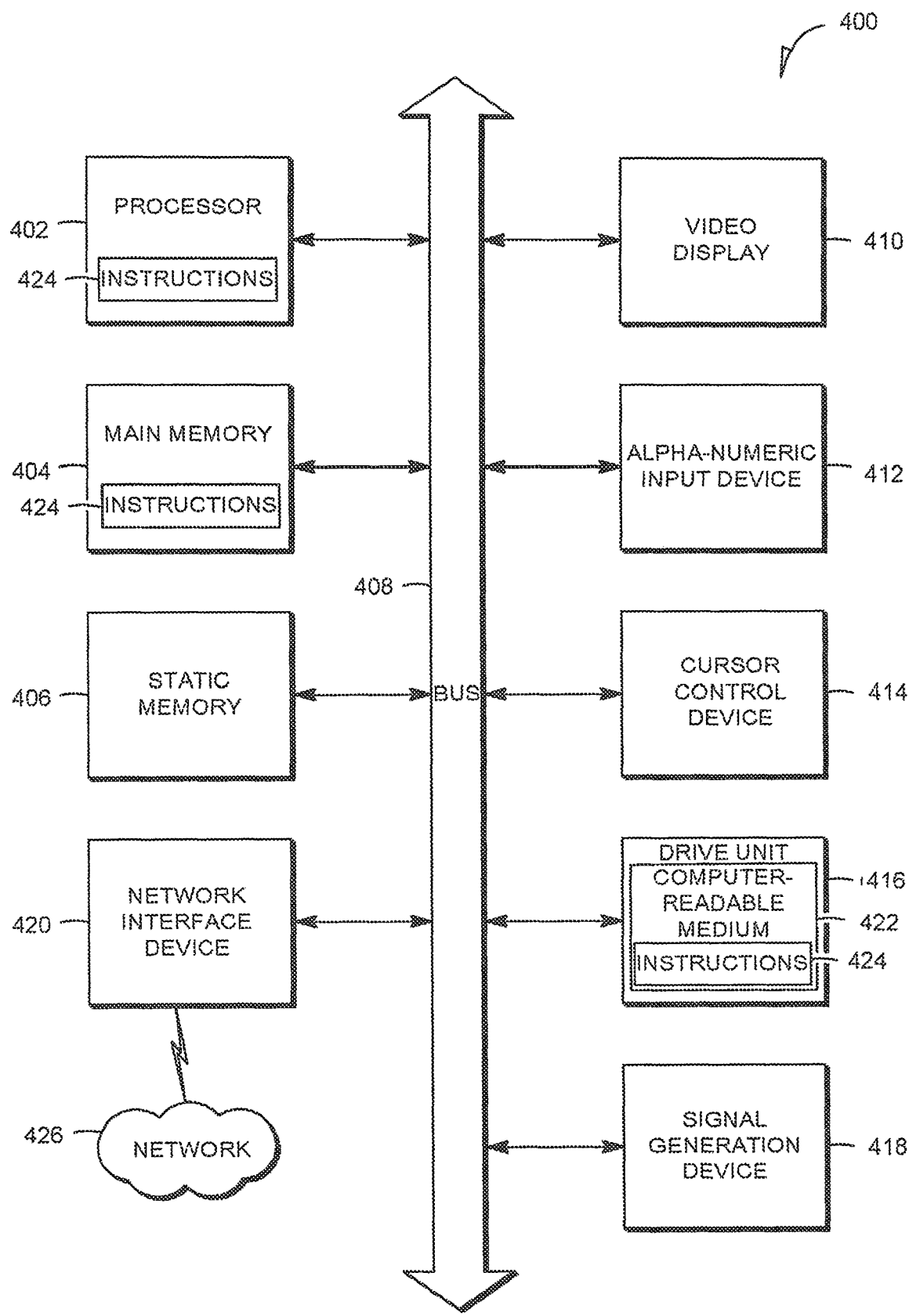
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types. In some embodiments, the executable file 106 may be executed by the computer system 400 upon the neural network architecture classifying the executable file as clean (i.e., free of malware).

As indicated above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smartphones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
   receiving an executable file, wherein the executable file is comprised of one or more bytes;
   embedding the executable file by converting each of the bytes in the executable file to vectors;
   determining whether the executable file includes malware by passing the vectors through a convolutional neural network (CNN), wherein the CNN includes a plurality of convolutional layers and a global average pooling layer, and wherein the CNN further includes a max pooling layer and a plurality of fully connected layers, and wherein the plurality of convolutional layers includes a first set of convolutional layers and a second set of convolutional layers, and wherein said passing the vectors through the CNN comprises:
      passing the vectors to an input of the first set of convolutional layers;
      passing an output of the first set of convolutional layers to an input of the max pooling layer;
      passing an output of the max pooling layer to an input of the second set of convolutional layers;
      passing an output of the second set of convolutional layers to an input of the global average pooling layer; and
   passing an output of the global average pooling layer to an input of the fully connected layers; and
   providing an output indicating the determination of whether the received executable file includes the malware.

2. The method of claim 1, wherein each of the bytes is an eight-dimensional vector.

3. The method of claim 1, further comprising projecting, by the global average pooling layer, the output of the second set of convolutional layers to a fixed size representation.

4. The method of claim 1, further comprising:
   shifting a first convolutional kernel between adjacent convolutional layers of the first set of convolutional layers by four elements of the vector; and
   shifting a second convolutional kernel between adjacent convolutional layers of the second set of convolutional layers by eight elements of the vector.

5. The method of claim 1, further comprising:
   denying execution of the executable file in response to determining the executable file includes the malware; and
   executing the executable file in response to determining the executable file does not include the malware.

6. A system comprising:
   at least one processor; and
   a non-transitory computer readable storage medium having a program stored thereon, the program causing the at least one processor to execute the steps of:
      receiving an executable file, wherein the executable file is comprised of one or more bytes;
      embedding the executable file by converting each of the bytes in the executable file to vectors;
      determining whether the executable file includes malware by passing the vectors through a convolutional neural network (CNN), wherein the CNN includes a plurality of convolutional layers and a global average pooling layer, wherein the CNN further include a max pooling layer and a plurality of fully connected layers, and wherein the plurality of convolutional layers includes a first set of convolutional layers and a second set of convolutional layers, and wherein said passing the vectors through the CNN comprises:
  passing the vectors to an input of the first set of convolutional layers;
  passing an output of the first set of convolutional layers to an input of the max pooling layer;
  passing an output of the max pooling layer to an input of the second set of convolutional layers;
  passing an output of the second set of convolutional layers to an input of the global average pooling layer; and
  passing an output of the global average pooling layer to an input of the fully connected layers; and
providing an output indicating the determination of whether the received executable file includes the malware.

7. The system of claim 6, wherein each of the bytes is an eight-dimensional vector.

8. The system of claim 6, further comprising projecting, by the global average pooling layer, the output of the second set of convolutional layers to a fixed size representation.

9. The system of claim 6, further comprising:
shifting a first convolutional kernel between adjacent convolutional layers of the first set of convolutional layers by four elements of the vector; and
shifting a second convolutional kernel between adjacent convolutional layers of the second set of convolutional layers by eight elements of the vector.

10. The system of claim 6, further comprising:
denying execution of the executable file in response to determining the executable file includes the malware; and
executing the executable file in response to determining the executable file does not include the malware.

11. A non-transitory computer readable storage medium comprising a set of instructions executable by a computer, the non-transitory computer readable storage medium comprising:
  instructions for receiving an executable file, wherein the executable file is comprised of one or more bytes;
  instructions for embedding the executable file by converting each of the bytes in the executable file to vectors;
  instructions for determining whether the executable file includes malware by passing the vectors through a convolutional neural network (CNN), wherein the CNN includes a plurality of convolutional layers and a global average pooling layer, and wherein the CNN further includes a max pooling layer and a plurality of fully connected layers, and wherein the plurality of convolutional layers includes a first set of convolutional layers and a second set of convolutional layers, and wherein the instructions for passing the vectors through the CNN comprise:
    instructions for passing the vectors to an input of the first set of convolutional layers;
    instructions for passing an output of the first set of convolutional layers to an input of the max pooling layer;
    instructions for passing an output of the max pooling layer to an input of the second set of convolutional layers;
    instructions for passing an output of the second set of convolutional layers to an input of the global average pooling layer; and
    instructions for passing an output of the global average pooling layer to an input of the fully connected layers; and
  instructions for providing an output indicating the determination of whether the received executable file includes the malware.

12. The non-transitory computer readable storage medium of claim 11, further comprising instructions for projecting, by the global average pooling layer, the output of the second set of convolutional layers to a fixed size representation.

13. The non-transitory computer readable storage medium of claim 11, further comprising:
  instructions for shifting a first convolutional kernel between adjacent convolutional layers of the first set of convolutional layers by four elements of the vector; and
  instructions for shifting a second convolutional kernel between adjacent convolutional layers of the second set of convolutional layers by eight elements of the vector.

14. The non-transitory computer readable storage medium of claim 11, further comprising:
  instructions for denying execution of the executable file in response to determining the executable file includes the malware; and
  instructions for executing the executable file in response to determining the executable file does not include the malware.

15. A method comprising:
  receiving, at one or more computing devices, an executable file, wherein the executable file is comprised of one or more bytes;
  embedding the executable file by converting each of the bytes in the executable file to vectors;
  determining whether the received executable file includes malware by passing the vectors through a convolutional neural network (CNN), wherein the CNN includes a plurality of convolutional layers and a global average pooling layer; and wherein the CNN further includes a max pooling layer and a plurality of fully connected layers, and wherein the plurality of convolutional layers includes a first set of convolutional layers and a second set of convolutional layers, and wherein said passing the vectors through the CNN comprises:
  passing the vectors to an input of the first set of convolutional layers;
  passing an output of the first set of convolutional layers to an input of the max pooling layer;
  passing an output of the max pooling layer to an input of the second set of convolutional layers;
  passing an output of the second set of convolutional layers to an input of the global average pooling layer; and
  passing an output of the global average pooling layer to an input of the fully connected layers; and
  providing an output indicating whether the received executable file includes the malware.

16. The method of claim 15, wherein the determining comprises determining, using an executable file classification engine stored in one or more memory devices of the one or more computing devices, whether the received executable file includes the malware, the executable file classification engine being trained, using supervised learning, to classify the executable file into at least one of a plurality of classes.

17. The method of claim 15, wherein the determining comprises determining, based on a feature vector comprising a plurality of features extracted from at least a portion of the received executable file.

* * * * *